United States Patent
Sladek, Jr.

(10) Patent No.: US 9,255,529 B2
(45) Date of Patent: Feb. 9, 2016

(54) LONGITUDINAL G ADJUSTED THROTTLE RESPONSE

(75) Inventor: Thomas J. Sladek, Jr., Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1510 days.

(21) Appl. No.: 12/711,017

(22) Filed: Feb. 23, 2010

(65) Prior Publication Data

US 2011/0208402 A1   Aug. 25, 2011

(51) Int. Cl.
*F02D 11/10* (2006.01)
*B60K 31/10* (2006.01)
*B60K 31/04* (2006.01)

(52) U.S. Cl.
CPC ............ *F02D 11/105* (2013.01); *B60K 31/045* (2013.01); *B60K 31/107* (2013.01); *F02D 2250/18* (2013.01)

(58) Field of Classification Search
CPC . F02D 11/105; F02D 2250/18; B60K 31/045; B60K 31/107
USPC ................ 701/93, 94, 95, 102, 70, 101, 110; 123/319, 361, 399, 403
See application file for complete search history.

(56) References Cited

U.S. PATENT DOCUMENTS

| | | | |
|---|---|---|---|
| 4,833,612 A * | 5/1989 | Okuno et al. .................... 701/95 |
| 4,849,892 A | 7/1989 | McCombie |
| 5,096,015 A * | 3/1992 | Akishino et al. .............. 180/179 |
| 5,128,869 A * | 7/1992 | Akishino et al. ................. 701/97 |
| 5,197,564 A * | 3/1993 | Nishimura et al. ........... 180/179 |
| 5,224,045 A | 6/1993 | Stasell |
| 5,392,215 A * | 2/1995 | Morita ............................ 701/94 |
| 5,532,929 A | 7/1996 | Hattori et al. |
| 5,557,519 A * | 9/1996 | Morita ............................. 701/1 |
| 5,638,277 A * | 6/1997 | Nagai .............................. 701/70 |
| 5,663,880 A * | 9/1997 | Saur et al. ....................... 701/93 |
| 5,665,026 A * | 9/1997 | Linden ........................... 477/108 |
| 5,868,214 A * | 2/1999 | Workman ..................... 180/179 |
| 5,927,425 A * | 7/1999 | Kusano ......................... 180/248 |
| 6,076,036 A * | 6/2000 | Price et al. ....................... 701/93 |
| 6,098,007 A | 8/2000 | Fritz |
| 6,188,316 B1 * | 2/2001 | Matsuno et al. .............. 340/441 |
| 6,236,915 B1 * | 5/2001 | Furukawa et al. .............. 701/25 |
| 6,295,500 B1 | 9/2001 | Cullen et al. |
| 6,317,666 B1 * | 11/2001 | List et al. ..................... 701/29.1 |
| 6,345,222 B1 | 2/2002 | Toukura et al. |
| 6,374,173 B1 * | 4/2002 | Ehlbeck ......................... 701/93 |
| 6,459,981 B1 | 10/2002 | Gimmler et al. |

(Continued)

*Primary Examiner* — Hieu T Vo
*Assistant Examiner* — Sherman Manley
(74) *Attorney, Agent, or Firm* — Kenealy Vaidya LLP (57) ABSTRACT

A system and method for adjusting an engine throttle opening amount includes a slope-determining unit that determines an angle of inclination of a vehicle, a throttle request determining unit that determines a throttle request, and an engine control unit. The slope-determining unit may include a longitudinal g acceleration sensor. The engine control unit calculates a slope gain factor from the angle of inclination and compares the slope gain factor to a predetermined threshold. If the slope gain factor is greater than the predetermined threshold, the engine control unit generates a throttle command to increase the current throttle opening amount based on the throttle request and the slope gain factor. Alternatively, if the slope gain factor is less than or equal to the predetermined threshold, the engine control unit controls the throttle opening amount based on the throttle request and independently of the slope gain factor.

15 Claims, 5 Drawing Sheets

(56) References Cited

U.S. PATENT DOCUMENTS

| | | |
|---|---|---|
| 6,484,086 B2 * | 11/2002 | Jeon ................................ 701/93 |
| 6,676,561 B2 | 1/2004 | Fritzer et al. |
| 6,701,224 B1 * | 3/2004 | Klusemann ........................ 701/1 |
| 6,792,344 B2 * | 9/2004 | Minowa et al. ................. 701/96 |
| 6,920,865 B2 | 7/2005 | Lyon |
| 7,548,812 B2 * | 6/2009 | Guenthner et al. ............. 701/93 |
| 7,580,820 B2 * | 8/2009 | Sawada ............................. 703/8 |
| 7,587,267 B2 * | 9/2009 | Mori et al. ....................... 701/93 |
| 8,818,677 B2 * | 8/2014 | Inoue et al. ...................... 701/93 |
| 2002/0002433 A1 * | 1/2002 | Matsuno ........................ 701/67 |
| 2002/0161506 A1 * | 10/2002 | Ishizu et al. .................... 701/96 |
| 2003/0055551 A1 * | 3/2003 | Weber et al. .................... 701/93 |
| 2003/0225496 A1 * | 12/2003 | Coelingh et al. ............... 701/48 |
| 2005/0181908 A1 * | 8/2005 | Eriksson et al. .............. 477/107 |
| 2007/0193560 A1 | 8/2007 | Chae et al. |
| 2009/0187324 A1 * | 7/2009 | Lu et al. .......................... 701/94 |
| 2011/0208402 A1 * | 8/2011 | Sladek, Jr. .................... 701/102 |

* cited by examiner

| %<br>RPM | 0 | 10 | 20 | 30 | 40 | 50 | 60 | 70 | 80 | 90 | 100 |
|---|---|---|---|---|---|---|---|---|---|---|---|
| 0 | 0 | 5 | 10 | 20 | 36 | 43 | 54 | 66 | 70 | 76 | 85 |
| 2000 | 0 | 6 | 12 | 26 | 41 | 44 | 54 | 66 | 70 | 76 | 85 |
| 4000 | 0 | 8 | 19 | 29 | 42 | 45 | 54 | 66 | 70 | 76 | 85 |
| 6000 | 0 | 11 | 23 | 33 | 43 | 45 | 54 | 66 | 70 | 76 | 85 |
| 8000 | 0 | 12 | 24 | 34 | 43 | 45 | 54 | 66 | 70 | 76 | 85 |

Increasing Longitudinal G

Fig. 5A — Level Road

Fig. 5B — Slightly Inclined Road Slope $\alpha_{G_1} < \alpha_T$

Fig. 5C — Intermediate Inclined Road Slope $\alpha_{G_2} > \alpha_T$

Fig. 5D — Highly Inclined Road Slope $\alpha_{G_3} > \alpha_{G_2} > \alpha_T$

Increasing Longitudinal G

LONGITUDINAL G ADJUSTED THROTTLE RESPONSE

BACKGROUND

1. Field

The present invention relates to devices, systems, and processes that adjust throttle characteristics in response to varying operating states of a vehicle.

2. Description of the Related Art

In conventional vehicle systems, a degree of engine throttle opening is typically calculated as a function of a throttle request from a driver. As is known in the art, a throttle is a mechanism by which the flow of a fluid may be obstructed. In a conventional internal combustion engine, the throttle is a valve that regulates the amount of air entering the engine, thereby controlling the amount of fuel burned on each engine cycle as a result of the vehicle's fuel-injector or carburetor maintaining a substantially constant air to fuel ratio. In conventional vehicle systems, the throttle is typically a butterfly valve. In a fuel-injected engine, the throttle valve is housed in the throttle body, whereas in a carbureted engine, the throttle valve is housed in the carburetor.

In a conventional vehicle system, the control used by a driver to regulate engine power may be a throttle pedal (also referred to as an accelerator pedal). A driver can control the degree of opening of the throttle valve by adjusting the degree of depression of the accelerator pedal. When the throttle is completely open, the intake manifold is usually at ambient pressure. On the other hand, when the throttle valve is partially closed, a partial vacuum develops inside the intake manifold as the intake air drops below ambient pressure. The throttle valve may be controlled mechanically through mechanical linkage of the throttle valve and the accelerator pedal. Alternatively, in vehicles with electronic throttle control, opening characteristics of the throttle valve are controlled electronically by the vehicle's electronic control unit (ECU).

As noted above, in conventional vehicle systems, the accelerator pedal may be mechanically linked to the throttle valve to provide mechanical control of the throttle valve opening. Alternatively, in so-called "drive-by-wire" vehicles equipped with electronic throttle control, the accelerator pedal is not mechanically linked to the throttle. Instead, an electronic control unit (ECU) determines the required throttle opening degree based on a mapping to data measured from various sensors including an accelerator pedal position sensor, an engine speed sensor, a vehicle speed sensor, and so forth. In addition, ECUs may use signals generated by a throttle position sensor in a feedback loop to control throttle position. A throttle position sensor is a sensor used to monitor the position of the throttle valve in an engine. The sensor is typically located on the butterfly spindle of the throttle valve and is typically a potentiometer that provides a variable resistance that depends on the position of the throttle valve.

As discussed above, in conventional vehicle systems, throttle opening degree is typically a function of the throttle request of a driver (i.e. the displacement of the accelerator pedal). For a given engine speed, the throttle opening degree will increase as the throttle request increases. As engine speed increases, the throttle opening degree will generally increase for a given throttle request amount.

Some conventional vehicle systems also include sensor(s) for determining a longitudinal or transverse angle of inclination of a vehicle. For example, two or more sensors may be disposed in the fuel tank of a vehicle to determine the inclination of a vehicle based on differences in fill height that are detected by the sensors at the same point in time. The arrangement of the sensors may be modified so as to provide a measure of one or both of the longitudinal and transverse inclinations of the vehicle.

In addition, an acceleration sensor may be used to determine the longitudinal inclination of a vehicle. The acceleration sensor may operate by detecting actual vehicle acceleration in terms of absolute amounts of acceleration. In particular, the longitudinal inclination of a vehicle may be determined based on a time profile of acceleration values in combination with another operational quantity such as wheel rpm of the vehicle. An acceleration sensor can detect acceleration even when a vehicle is in a stationary state on an uphill or downhill slope as a result of the component of the gravitational force on the vehicle in the incline direction.

Adjusting torque transmission characteristics based, at least in part, on a signal generated by an acceleration sensor(s) is known in the art. For example, lowering the clutch disengagement threshold to slightly above the idling rpm rate when it is detected that the vehicle is traveling on a downhill slope in order to increase the time period during which the engine rpm and the transmission rpm run synchronously and to prevent repeated engagement and disengagement of the clutch is known in the art.

Also known in the art, is an apparatus and method that compensates for road gradient for more accurate control of an autonomous traveling vehicle. The method involves first detecting a position and speed of a vehicle based on detection signals received from magnetic sensors disposed on the vehicle that communicate with magnetic nails disposed at regular intervals on the road surface. A longitudinal acceleration of the vehicle is then acquired from a longitudinal sensor and is corrected on the basis of data indicative of the slope of the road received from a communication means. A predicted position and speed of the vehicle after T seconds are then calculated based on the information regarding the current position, speed, and acceleration of the vehicle.

Then, a target position and speed after T seconds based on a control plan of the vehicle are determined and the predicted position and speed after T seconds are subtracted from the target position and speed, respectively, to determine a positional error and a speed error. The positional error and the speed error are then multiplied by acceleration control gains to arrive at a target acceleration for the vehicle. However, the acceleration control gains are set assuming that the vehicle is traveling on a flat road. Therefore, the method corrects the target acceleration on the basis of the data indicative of the slope of the road such that the inclination of the road is compensated for and the speed of the vehicle agrees with the vehicle control command.

Also known in the art is an apparatus and method for controlling longitudinal dynamics of a vehicle. The method involves generating a drive train actuating signal that is generated as a function of input data comprising the current driving state of the vehicle and the desired longitudinal speed or acceleration. The apparatus includes a series of controllers that receive various inputs. In particular, a first controller receives a predefined longitudinal desired value that may be representative of either a longitudinal speed or a longitudinal acceleration. The first controller then generates a controller-internal desired driving speed and longitudinal acceleration based on the predefined longitudinal desired value and various information received from a sensor system. These values are supplied to a second controller. The second controller then generates a drive train actuating signal based on the values received from the first controller and the information received from the sensor system. This system is supplied to a drive train actuating element. The information supplied to both controllers from the sensor system may include variables representing current longitudinal acceleration and highway slope.

Various other apparatuses and methods are known in the art for compensating for changes in road gradient that produce changes in engine load and acceleration conditions. For example, various speed control mechanisms (also known as "cruise control" mechanisms) have been proposed that select the greater of a first desired vehicle acceleration based on a driver command and a second desired vehicle acceleration based on a speed control strategy and control the powertrain so that an actual vehicle acceleration approaches the desired vehicle acceleration. Such a speed control mechanism automatically reduces engine torque or the transmission of engine torque to the wheels when the vehicle is traveling downhill in order to maintain a constant speed, or automatically increases engine torque or transmission of engine torque to the wheels when the vehicle is traveling uphill or the driver demands greater acceleration.

In addition, a microprocessor-based control for maintaining vehicle speed as the vehicle encounters changes in road gradient is known in the art. The control first evaluates whether certain conditions are satisfied (e.g. whether the vehicle has experienced a deceleration exceeding a certain threshold, whether the vehicle speed is within a certain predefined range, and whether the vehicle's brakes are being applied by the driver). If these various conditions are satisfied, it is determined that the vehicle is being subjected to an increased load caused, for example, by an increase in road gradient, and the engine operation moves to a higher horsepower v. speed curve, thereby increasing the engine torque output. This allows the vehicle to maintain its speed as the road gradient increases.

Also known in the art is a system and method for adjusting an ordinary target driving force to compensate for increases in running resistance of a vehicle from the standard running resistance.

Although various types of sensors are known in the art for determining the inclination angle of a vehicle, employing a determination of the longitudinal angle of a vehicle to improve acceleration of the vehicle on increasingly inclined road surfaces, whether or not the vehicle is operating in a speed control (cruise control) state has not been addressed.

SUMMARY

In conventional vehicle systems, the engine throttle opening degree is determined as a function of the throttle request of a driver according to predetermined settings. The engine throttle opening degree typically increases for a given throttle request as the engine speed (rpm) increases. However, at high levels of throttle request (e.g. 56% or greater), the throttle opening degree remains substantially constant across engine speeds. In conventional vehicle systems, the predetermined settings that determine the throttle opening degree for a given throttle request and engine speed remain unchanged regardless of an inclination angle of a surface on which the vehicle is traveling. As the slope of a road surface increases and the angle of inclination of the vehicle traveling on that road surface consequently increases as well, the engine load can increase dramatically. As a vehicle attempts to accelerate on an increasingly steeper slope, the increased engine load makes the vehicle feel weak to the driver. As a result, the driver is required to increase the throttle request in order to maintain the desired amount of acceleration.

According to an aspect of the disclosed subject matter, a system for determining an engine throttle opening amount includes a slope-determining unit that determines an angle of inclination of a vehicle, a throttle request determining unit that determines a throttle request, and an engine control unit that controls the engine throttle opening amount based on the determinations of the slope-determining unit and the throttle request determining unit on the condition that a predetermined criteria is satisfied.

According to another aspect of the disclosed subject matter, the engine control unit receives as inputs the angle of inclination of the vehicle determined by the slope-determining unit, the throttle request determined by the throttle request determining unit, and a current throttle opening amount. In addition, the engine control unit includes a calculating unit that calculates a slope gain factor based on the angle of inclination of the vehicle determined by the slope-determining unit and a comparing unit that compares the slope gain factor to a predetermined threshold, wherein on the condition that the slope gain factor is greater than the predetermined threshold, the engine control unit generates a throttle command to increase the current throttle opening amount according to predetermined settings based on the throttle request and the slope gain factor.

According to another aspect of the disclosed subject matter, the engine control unit generates a throttle command to control the throttle opening amount based on the throttle request and independently of the slope gain factor calculated by the calculating unit if the comparing unit determines that the slope gain factor is less than or equal to the predetermined threshold.

According to another aspect of the disclosed subject matter, a method for determining an engine throttle opening amount includes determining an angle of inclination of a vehicle, determining a throttle request, and controlling the engine throttle opening amount based on the determined angle of inclination of the vehicle and the determined throttle request on the condition that a predetermined criteria is satisfied.

According to another aspect of the disclosed subject matter, the method for determining an engine throttle opening amount further includes receiving as inputs the determined angle of inclination of the vehicle, the determined throttle request, and a current throttle opening amount, calculating a slope gain factor based on the determined angle of inclination of the vehicle, comparing the slope gain factor to a predetermined threshold, generating a throttle command to increase the current throttle opening amount according to predetermined settings based on the throttle request and the slope gain factor on the condition that the slope gain factor is greater than the predetermined threshold, and generating a throttle command to control the current throttle opening amount according to predetermined settings based on the throttle request and independently of the slope gain factor on the condition that the slope gain factor is less than or equal to the predetermined threshold. The generated throttle command is then sent to a throttle actuating element that adjusts the current throttle opening in accordance with the throttle command.

According to any of the previously described aspects of the disclosed subject matter, the slope-determining unit may be a longitudinal g acceleration sensor, two or more sensors disposed in the fuel tank of a vehicle that detect the slope of the vehicle based on differences in fill height measured at the same point in time, or any other sensor known in the art for determining the slope of a vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1A:
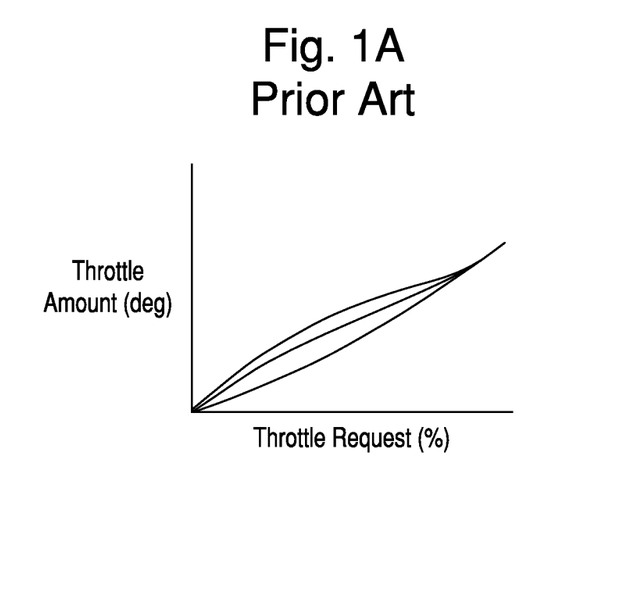
FIG. 1A illustrates a plot of throttle opening degree versus throttle request for various engine rpm speeds for a conventional vehicle system.
Figure 1B:
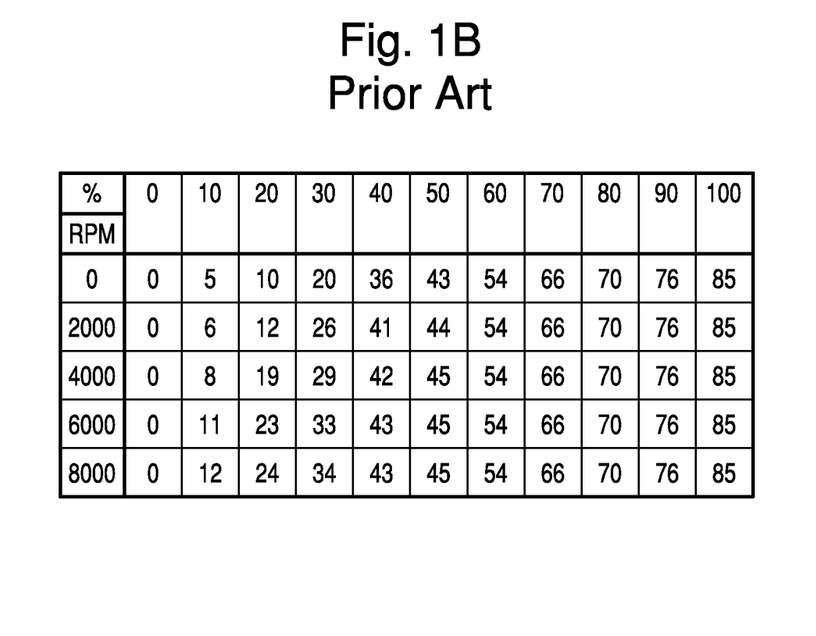
FIG. 1B shows the plot values of FIG. 1A in table format.

FIG. 1A illustrates a plot of throttle opening degree versus throttle request for various engine rpm speeds for a conventional vehicle system. As is shown in FIG. 1A, the throttle opening degree generally increases as a function of throttle request. At lower levels of throttle request, the corresponding degree of throttle opening is generally larger as the engine rpm speed increases. Thus, in FIG. 1A, the lower plot line corresponds to the relationship between the torque amount and the throttle request at a lower rpm and the upper plot line corresponds to the relationship between the torque amount and the throttle request at a higher rpm. However, as the degree of throttle request increases above a certain threshold, the throttle opening degree remains substantially constant across engine speeds. In addition, for certain values of throttle request, the degree of throttle opening degree increases initially for lower engine speeds as the engine rpm speed increases, but eventually reaches a substantially constant level for higher engine speeds. FIG. 1B shows the plot values of FIG. 1A in table format. In FIG. 1B, for example, when the throttle request is 50%, the degree of throttle opening generally increases as engine rpm speed increases from 0 up to 4000 rpm, and then levels off at 45 degrees for engine rpm speeds beyond 4000 rpm. Further, as shown in FIG. 1B, for throttle request values of 60%-100%, the corresponding degree of throttle request is constant across engine rpm speeds from 0 rpm to 8000 rpm.

Figure 2A:
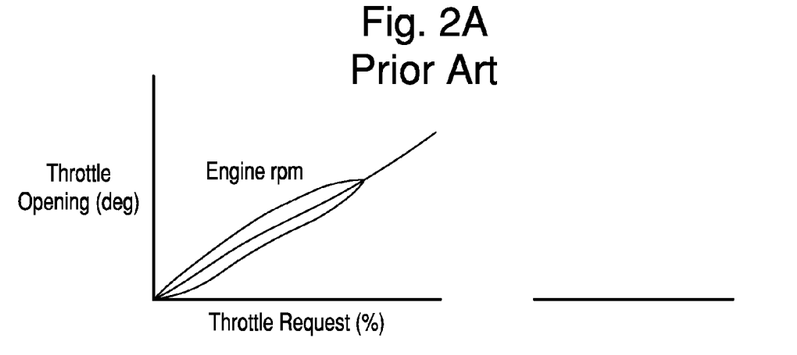
FIG. 2A is a plot of engine throttle opening amount versus throttle request for various engine speeds for a vehicle on a substantially level road surface in accordance with a conventional vehicle system.
Figure 2B:
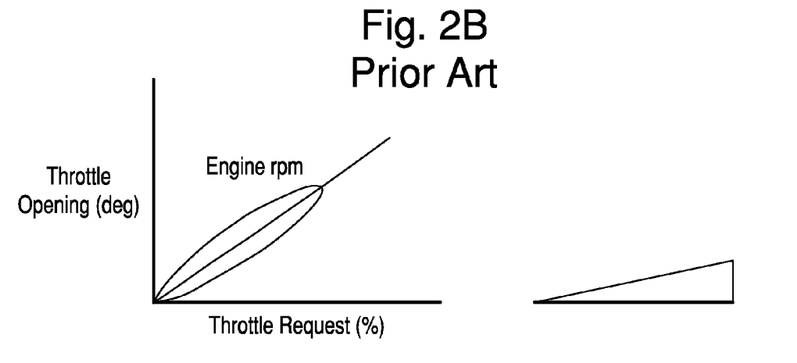
FIG. 2B is a plot of engine throttle opening amount versus throttle request for various engine speeds for a vehicle on an intermediate inclined road surface in accordance with a conventional vehicle system.
Figure 2C:
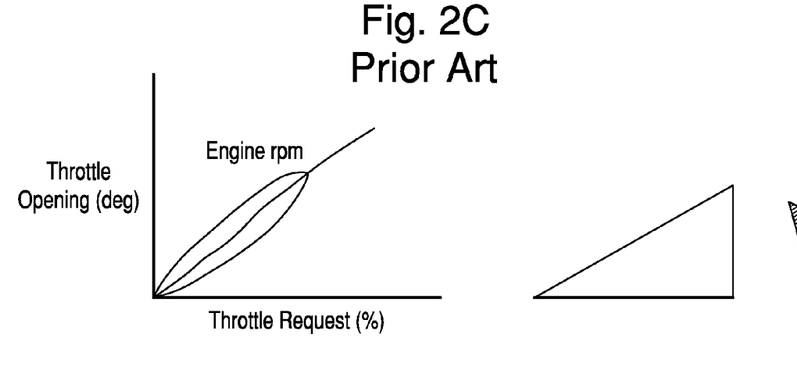
FIG. 2C is a plot of engine throttle opening amount versus throttle request for various engine speeds for a vehicle on a highly inclined road surface in accordance with a conventional vehicle system.

FIGS. 2A-2C illustrate plots of throttle opening degree versus throttle request corresponding to increasing levels of vehicle slope in accordance with conventional vehicle systems. FIG. 2A depicts a plot of throttle opening degree as a function of throttle request for various engine speeds for a vehicle on a substantially level slope. FIG. 2B depicts of plot of throttle opening degree as a function of throttle request for various engine speeds for a vehicle on an intermediate uphill slope. FIG. 2C depicts a plot of throttle opening degree as a function of throttle request for various engine speeds for a vehicle on a very steep uphill slope. As is shown in FIGS. 2A-2C, for a given throttle request and engine speed, the corresponding throttle opening degree is unchanged regardless of the slope or angle of inclination of the vehicle. As a result, in conventional vehicle systems, as a vehicle attempts to accelerate on an increasingly steeper slope, the vehicle feels weak to the driver. This typically requires the driver to increase the throttle request in order to maintain the current vehicle speed or acceleration. In particular, in conventional vehicle systems, the same predetermined settings are used to determine the degree of throttle opening for a given throttle request and engine speed regardless of changes in the load on the engine caused by variations in the incline of the surface on which the vehicle is traveling.

Figure 3:
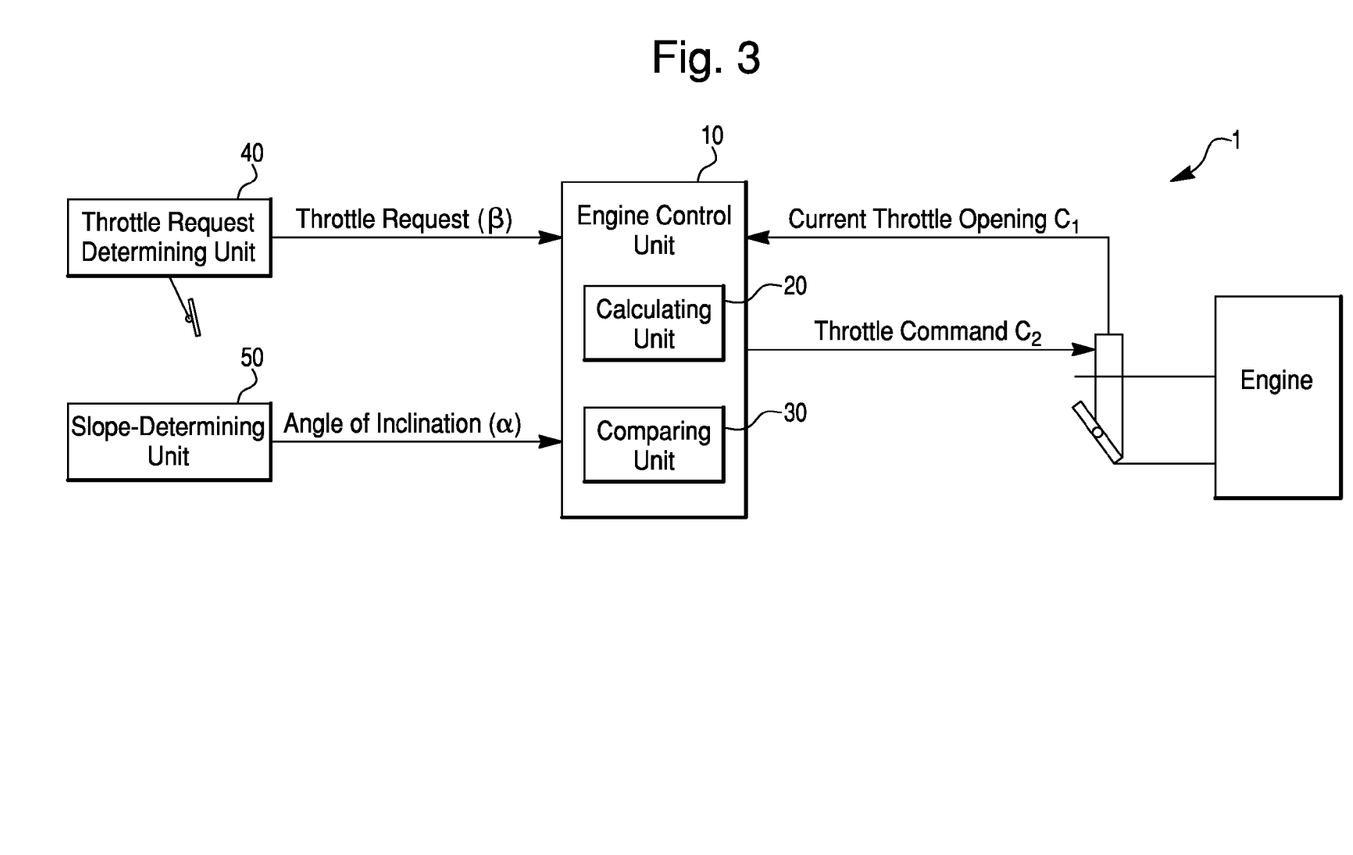
FIG. 3 is a schematic of a system for adjusting an engine throttle opening amount in accordance with the disclosed subject matter.
Figure 4:
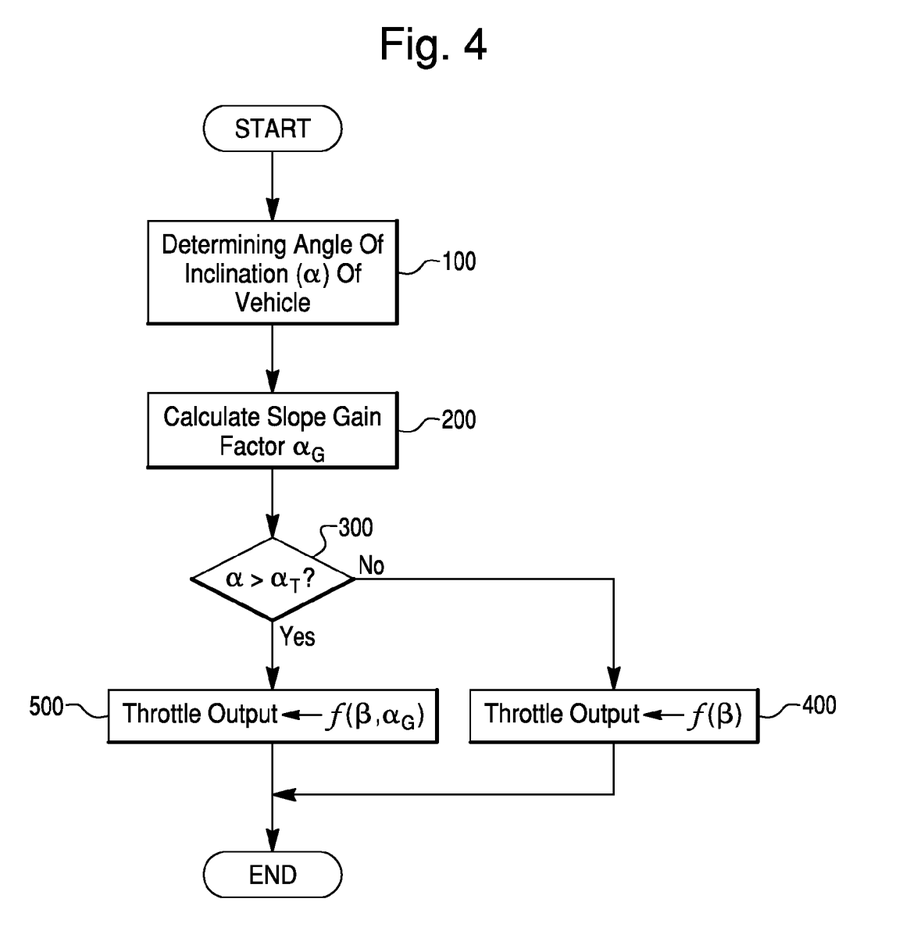
FIG. 4 is flow chart depicting a method of adjusting throttle opening degree in accordance with the disclosed subject matter.

FIG. 3 and FIG. 4 depict a system and method, respectively, according to aspects of the present disclosure that address the above-stated disadvantages of conventional vehicle systems. Referring to FIG. 3, a system 1 for adjusting an engine throttle opening amount includes an engine control unit 10 that comprises a calculating unit 20 and a comparing unit 30. The engine control unit 10 may comprises one or more microprocessors and one or more ROM and/or RAM units. The calculating unit 20 and comparing unit 30 may be formed of any suitable hardware circuitry known in the art. The system 1 further includes a throttle request determining unit 40 and a slope-determining unit 50 that determine a throttle request of a driver $\beta$ and an angle of inclination $\alpha$ of a vehicle, respectively.

Still referring to FIG. 3, the engine control unit of the system 1 according to aspects of the present disclosure receives as inputs the angle of inclination $\alpha$ of the vehicle, the throttle request of the driver $\beta$, and the current engine throttle opening $C_1$. The engine control unit then performs a series of processing steps based on the input values received and generates a throttle command $C_2$ according to predetermined settings. The throttle command generated is then sent to an engine throttle actuating element that adjusts the current throttle opening in accordance with the throttle command.

The processing steps performed by the engine control unit are described in greater detail with reference to FIG. 4 which is a process flow diagram that depicts a method for adjusting engine throttle opening amount in accordance with aspects of the present disclosure. In step 100, the current angle of inclination $\alpha$ of the vehicle is determined by the slope-determining unit 50. The slope-determining unit 50 may include a longitudinal g sensor that determines the angle of inclination of the vehicle by measuring variations in acceleration values of the vehicle. Alternatively, the slope-determining unit 50 may include two or sensors disposed in the fuel tank of the vehicle that calculate the slope of the vehicle based on differences in measurements of fill height taken simultaneously by the sensors. The angle of inclination may also be determined from a current engine torque for a given velocity or from a deviation from a flat road acceleration to a known predetermined acceleration.

The angle of inclination $\alpha$ of the vehicle determined by the slope-determining unit 50 is then received as an input by the engine control unit 10. In step 200, the calculating unit 20 of engine control unit 10 then calculates a slope gain factor $\alpha_G$ from the angle of inclination $\alpha$ of the vehicle. In step 300, the calculated slope gain factor $\alpha_G$ is compared to a predetermined threshold value $\alpha_T$. If it is determined that the slope gain factor $\alpha_G$ is greater than the predetermined threshold value $\alpha_T$, then the processing proceeds to step 500 and the throttle output is calculated as a function of the throttle request $\beta$ and the slope gain factor $\alpha_G$. More specifically, the engine control unit 10 generates a throttle command $C_2$ based on the throttle request $\beta$ and the slope gain factor $\alpha_G$ to increase the current throttle opening $C_1$ according to predetermined settings. Thus, if the vehicle is traveling on a steep incline (as represented by a slope gain factor $\alpha_G$ that exceeds the predetermined threshold $\alpha_T$), the engine control unit 10 will generate a throttle command to increase the throttle opening amount for a given throttle request such that the driver will not need to increase the throttle request (i.e., increase the force exerted on the accelerator pedal) in order to maintain the current vehicle speed or acceleration.

Alternately, if the comparing unit 30 of engine control unit 10 determines that the calculated slope gain factor $\alpha_G$ is less than or equal to the predetermined threshold $\alpha_T$, then in step 400, the throttle output is calculated as a function of the throttle request $\beta$, but not as a function of the slope gain factor $\alpha_G$. That is, if slope gain factor $\alpha_G$ is less than or equal to the predetermined threshold $\alpha_T$, the throttle output is calculated independently of the slope gain factor $\alpha_G$. More specifically, the engine control unit 10 generates a throttle command $C_2$ based on the throttle request $\beta$ and independently of the slope gain factor $\alpha_G$ in accordance with predetermined settings and sends the throttle command $C_2$ to an engine throttle actuating element that controls the engine throttle in accordance with the throttle command $C_2$. A slope gain factor $\alpha_G$ less than or equal to the predetermined threshold $\alpha_T$, corresponds to an angle of inclination of the vehicle that is not significant enough to generate engine load that gives a driver the impression of reduced vehicle power and reduced capability to accelerate. As such, the engine control unit 10 generates the throttle command $C_2$ as a function of the throttle request $\beta$ according to standard predetermined settings.

However, when the slope gain factor $\alpha_G$ is greater than the predetermined threshold $\alpha_T$, the incline of the slope on which the vehicle is traveling generates enough load on the engine to produce an appreciable reduction in vehicle power. As such, in these instances, the engine control unit 10 generates a throttle command $C_2$ based on both the throttle request $\beta$ and the slope gain factor $\alpha_G$ to increase the current throttle opening to a specific value in accordance with predetermined settings. For slope gain factor values above the predetermined threshold $\alpha_T$, as the slope gain factor increases, the throttle output increases as well. That is, as the slope of the surface on which the vehicle is traveling increases, the throttle command $C_2$ generated by the engine control unit 10 will instruct the throttle actuating element to increase the current throttle opening by increasingly larger amounts (as long as the slope is such that the slope gain factor exceeds the predetermined threshold $\alpha_T$).

Figure 5A:
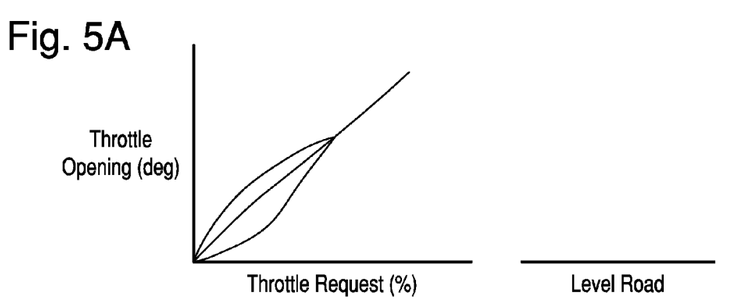
FIG. 5A is a plot of engine throttle opening amount versus throttle request for various engine speeds for a vehicle on a substantially level road surface in accordance with the disclosed subject matter.
Figure 5B:
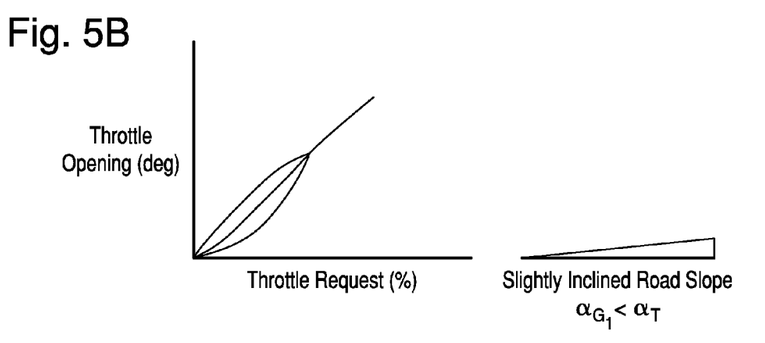
FIG. 5B is a plot of engine throttle opening amount versus throttle request for various engine speeds for a vehicle on a slightly inclined road surface in accordance with the disclosed subject matter.
Figure 5C:
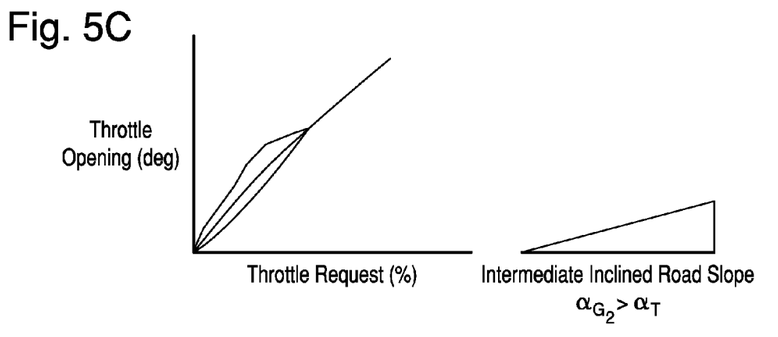
FIG. 5C is a plot of engine throttle opening amount versus throttle request for various engine speeds for a vehicle on an intermediate inclined road surface in accordance with the disclosed subject matter.
Figure 5D:
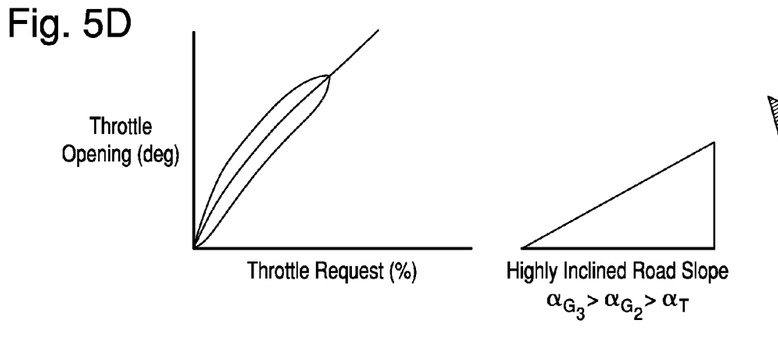
FIG. 5D is a plot of engine throttle opening amount as a function of throttle request for various engine speeds for a vehicle on a highly inclined road surface in accordance with the disclosed subject matter.

FIGS. 5A-5D depict plots of throttle opening degree versus throttle request corresponding to increasing levels of vehicle slope in accordance with aspects of the present disclosure. In each of FIGS. 5A-5D, the y-axis represents throttle opening degree and the x-axis represents throttle request. FIG. 5A depicts a plot of throttle opening degree versus throttle request for various engine speeds for a vehicle on a substantially level slope, FIG. 5B depicts a plot of throttle opening degree versus throttle request for various engine speeds for a vehicle on a slightly inclined slope, FIG. 5C depicts a plot of throttle opening degree versus throttle request for various engine speeds for a vehicle traveling on an intermediate uphill slope, and FIG. 5D depicts a plot of throttle opening degree versus throttle request for various engine speeds for a vehicle traveling on a very steep uphill slope.

In FIG. 5B, the road surface is slightly inclined as compared to the surface in FIG. 5A. However, the slope gain factor calculated from the slope of the surface in FIG. 5B does not exceed the predetermined threshold $\alpha_T$, and as a result, the throttle opening degree is calculated according to predetermined settings as a function of the throttle request and independently of the slope gain factor. Therefore, for a given throttle request and engine speed, the throttle opening degree in FIG. 5B is equivalent to the throttle opening degree in FIG. 5A (i.e., the plots shown in FIGS. 5A and 5B are equivalent).

However, in FIG. 5C, the vehicle is traveling on an intermediate uphill slope that yields a slope gain factor that exceeds the predetermined threshold $\alpha_T$. As a result, the throttle opening degree is calculated according to predetermined settings as a function of both the throttle request and the slope gain factor. In particular, as discussed earlier, the engine control unit 10 generates a throttle command $C_2$ based on the throttle request and the slope gain factor to increase the current throttle opening by a specified value in accordance with predetermined settings. As a consequence, for a given throttle request and engine speed, the corresponding throttle opening degree is greater in FIG. 5C (when the vehicle is traveling on an intermediate uphill slope) than it is in FIG. 5A (when the vehicle is traveling on a substantially level surface) or FIG. 5B (when the slope of the road surface does not produce a slope gain factor that exceeds the predetermined threshold $\alpha_T$).

In FIG. 5D, the vehicle is traveling on a very steep uphill slope. The slope gain factor corresponding to the road slope in FIG. 5D exceeds the slope gain factor for the road slope in FIG. 5C. Thus, in this instance, the engine control unit 10 generates a throttle command $C_2$ based on the throttle request and the slope gain factor to increase the current throttle opening by a value in accordance with predetermined settings that is greater than the increase in throttle opening specified by the throttle command generated for the intermediate uphill road slope of FIG. 5C. More specifically, for a given throttle request and engine speed, the corresponding throttle opening degree is even greater for a vehicle traveling on the inclined surface of FIG. 5D than for a vehicle traveling on the inclined surface of FIG. 5C. The angle of inclination of a vehicle traveling on the road surface of FIG. 5D places a greater load on the engine than the angle of inclination of a vehicle traveling on the road surface of FIG. 5C. As a result, for a given throttle request and engine speed, a larger throttle opening degree is necessary in order to improve the acceleration feeling of the vehicle and maintain the desired vehicle speed or level of acceleration.

According to any of the previously described aspects of the present disclosure, the predetermined settings that determine the throttle opening degree for a given throttle request and/or slope gain factor may be stored in a memory unit housed in the engine control unit. In addition, the predetermined threshold $\alpha_T$ against which the slope gain factor is compared may also be stored in the same memory unit or a different memory unit.

While certain embodiments of the invention are described above, it should be understood that the invention can be embodied and configured in many different ways without departing from the spirit and scope of the invention.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for adjusting an engine throttle opening amount, the system comprising:
    a slope-determining unit configured to determine a longitudinal angle of inclination of a vehicle from one of
        a current engine torque for a given velocity, and
        a deviation from a flat road acceleration to a known predetermined acceleration;
    a throttle request determining unit configured to determine a throttle request; and
    an engine control unit configured to control the engine throttle opening amount based on the determinations of the slope-determining unit and the throttle request determining unit on the condition that predetermined criteria is satisfied,
    wherein the engine control unit receives as inputs the angle of inclination of the vehicle determined by the slope-determining unit, the throttle request determined by the throttle request determining unit, and a current throttle opening amount, the engine control unit including:
    a calculating unit configured to calculate a slope gain factor based on the angle of inclination of the vehicle determined by the slope-determining unit; and
    a comparing unit configured to compare the slope gain factor to a predetermined threshold,
    wherein on the condition that the slope gain factor is greater than the predetermined threshold, the engine control unit is configured to generate a throttle command to increase the current throttle opening amount according to at least one predetermined setting based on the throttle request and the slope gain factor,
    wherein on the condition that the slope gain factor is less than or equal to the predetermined threshold, the engine control unit is configured to generate a throttle command that controls the throttle opening amount based on the throttle request and independently of the slope gain factor, and
    wherein the predetermined threshold is variable and is a function of at least one of an instantaneous speed of the vehicle and the angle of inclination of the vehicle.

2. The system of claim 1, wherein the slope-determining unit includes a longitudinal g acceleration sensor.

3. The system of claim 1, wherein the throttle request determining unit is an acceleration pedal sensor.

4. The system of claim 1, wherein the at least one predetermined setting is stored in a memory unit housed in the engine control unit.

5. The system of claim 1, wherein on the condition that the slope gain factor is greater than the predetermined threshold, the throttle command generated by the engine control unit increases the current throttle opening amount according to the at least one predetermined setting such that a current vehicle speed or vehicle acceleration is maintained without an increase in the throttle request.

6. The system of claim 1, wherein a speed of the vehicle is being maintained at a substantially constant level by a speed control mechanism.

7. The system of claim 1, wherein a speed of the vehicle is being controlled manually by a driver.

8. The system of claim 1, wherein the predetermined threshold is determined as a function of at least one of a make and a model of the vehicle.

9. A method for determining an engine throttle opening amount, the method comprising:
    using a slope-determining controller, determine an angle of inclination of a vehicle;
    using a request controller, determine a throttle request;
    using an engine controller, control the engine throttle opening amount based on the determined angle of inclination of the vehicle and the determined throttle request on the condition that predetermined criteria is satisfied;
    using the engine controller, receive as inputs the determined angle of inclination of the vehicle, the determined throttle request, and a current throttle opening amount;
    using the engine controller, calculate a slope gain factor based on the determined angle of inclination of the vehicle;
    using the engine controller, compare the slope gain factor to a predetermined threshold;
    using the engine controller, generate a throttle command to increase the current throttle opening amount according to a predetermined setting based on the throttle request and the slope gain factor on the condition that the slope gain factor is greater than the predetermined threshold, or generating a throttle command to control the current throttle opening amount according to at least one predetermined setting based on the throttle request and independently of the slope gain factor on the condition that the slope gain factor is less than or equal to the predetermined threshold; and
    using the engine controller, send the generated throttle command to a throttle actuating element that adjusts the current throttle opening amount in accordance with the throttle command;
    wherein the angle of inclination is determined from a current engine torque for a given velocity, and
    wherein the predetermined threshold is variable and is a function of at least one of an instantaneous speed of the vehicle and the angle of inclination of the vehicle.

10. The method of claim 9, wherein the throttle request is determined by an acceleration pedal sensor.

11. The method of claim 9, wherein the at least one predetermined setting is stored in a memory unit housed in an engine control unit of the vehicle.

12. The method of claim 9, wherein on the condition that the slope gain factor is greater than the predetermined threshold, the throttle command generated and sent to the throttle actuating element instructs the throttle actuating element to increase the current throttle opening amount according to the at least one predetermined setting such that a current vehicle speed or vehicle acceleration is maintained without an increase in the throttle request.

13. The method of claim 9, wherein a speed of the vehicle is being maintained at a substantially constant level by a speed control mechanism.

14. The method of claim 9, wherein a speed of the vehicle is being controlled manually by a driver of the vehicle.

15. The method of claim 9, wherein the predetermined threshold is determined as a function of at least one of a make and a model of the vehicle.

\* \* \* \* \*